(12) United States Patent
Krimmel

(10) Patent No.: US 7,620,319 B2
(45) Date of Patent: Nov. 17, 2009

(54) PASSIVE OPTICAL NETWORK MONITORING METHOD AND PASSIVE OPTICAL NETWORK

(75) Inventor: Heinz-Georg Krimmel, Korntal-Münchingen (DE)

(73) Assignee: Alcatel, Paris (FR)

( * ) Notice: Subject to any disclaimer, the term of this patent is extended or adjusted under 35 U.S.C. 154(b) by 411 days.

(21) Appl. No.: 11/285,292

(22) Filed: Nov. 23, 2005

(65) Prior Publication Data
US 2006/0133806 A1 Jun. 22, 2006

(30) Foreign Application Priority Data
Dec. 21, 2004 (EP) ................... 04293072

(51) Int. Cl.
*H04B 10/08* (2006.01)
*H04J 14/00* (2006.01)

(52) U.S. Cl. ................ 398/33; 398/25; 398/9; 398/66; 398/13; 398/63

(58) Field of Classification Search ............. 398/72, 398/66–71, 13, 9, 16, 31–34, 30, 25, 28, 398/14, 20, 58, 63, 22, 23, 24; 356/73.1
See application file for complete search history.

(56) References Cited
U.S. PATENT DOCUMENTS
5,416,623 A * 5/1995 Dawson et al. ............... 398/33
6,317,055 B1 * 11/2001 Fujisawa ..................... 340/850

6,721,315 B1 * 4/2004 Xiong et al. ................. 370/389
6,970,480 B2 * 11/2005 van Heyningen et al. .... 370/508
7,277,637 B2 * 10/2007 Jette et al. ..................... 398/70
2002/0018468 A1 * 2/2002 Nishihara .................... 370/389

FOREIGN PATENT DOCUMENTS
DE 4428350 A1 2/1995
EP 0 786 878 A 7/1997
WO WO 2004/079404 A 9/2004

* cited by examiner

*Primary Examiner*—M. R. Sedighian
(74) *Attorney, Agent, or Firm*—Sughrue Mion, PLLC

(57) ABSTRACT

This invention relates to a method for monitoring at least one section (50) of an optical fiber link (15,16), preferably a distribution section behind a passive distribution node (10-13), of a passive Optical Network, and a passive Optical Network being designed to perform the steps of the method. The method is comprising the steps of:—sending a first optical monitoring signal (40) through said section at a first signal sending time by sending means (81,34) of a first transceiver device (30,1-9) of the passive Optical Network,—sending at least a second optical monitoring signal (41-45) through said section at a second signal sending time by sending means (81,34) of a second transceiver device (30,1-9) of the passive Optical Network, wherein the sending times of said optical monitoring signals (40-45), preferably Optical Time Domain Reflectometry Signals, are coordinated in such a way that the optical monitoring signals (40-45) are superimposed while travelling through said section, building a measuring signal (52), and—detecting and analysing characteristics of at least parts of said measuring signal (52) preferably by at least one of the optical monitoring signal sending transceiver devices (1-9).

22 Claims, 1 Drawing Sheet

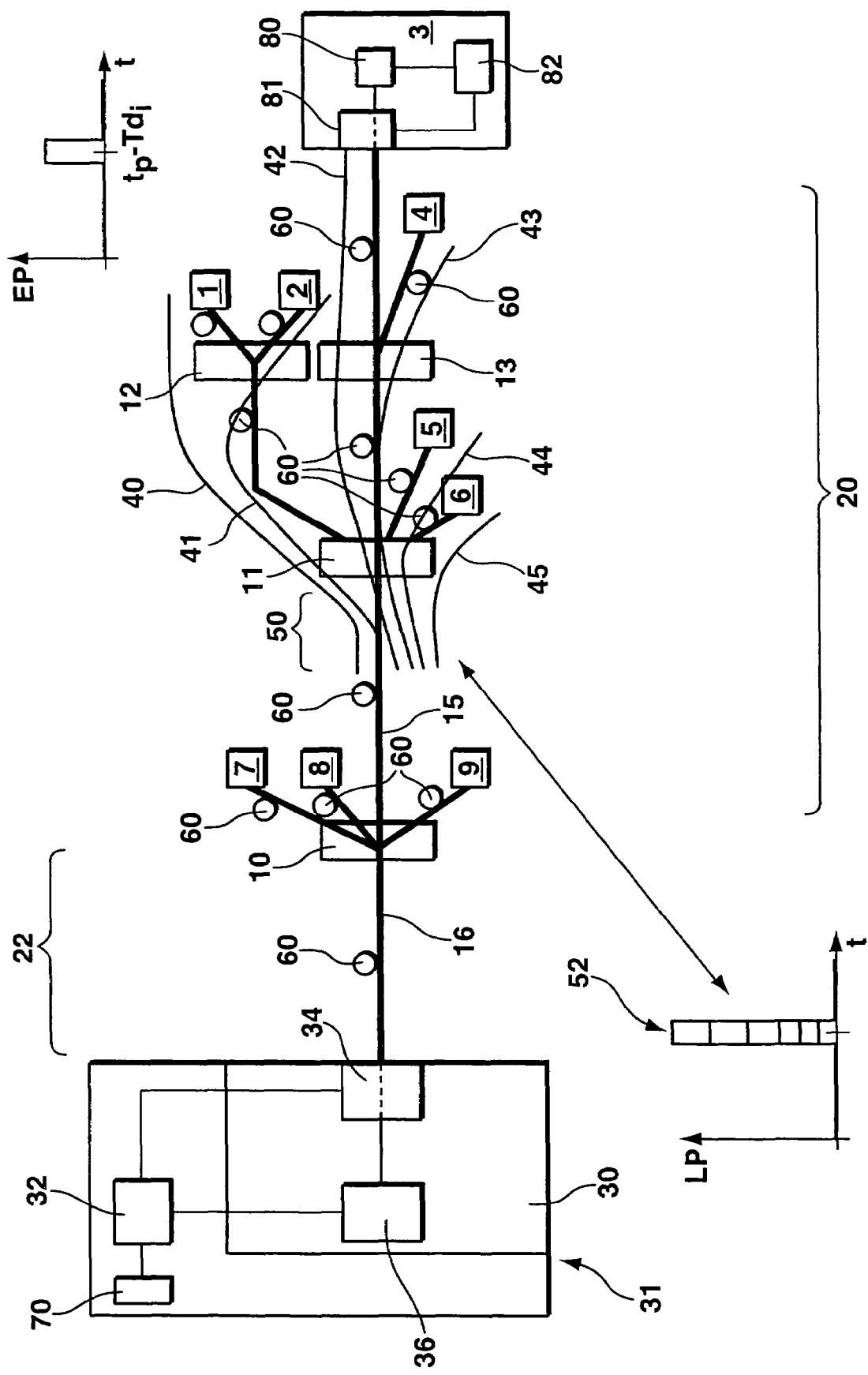

PASSIVE OPTICAL NETWORK MONITORING METHOD AND PASSIVE OPTICAL NETWORK

The invention is based on a priority application EP 04293072.7 which is hereby incorporated by reference.

FIELD OF THE INVENTION

This invention relates to a passive Optical Network (PON), in particular an Optical Distribution Network (ODN), monitoring method and a passive Optical Network, being designed to carry out the steps of the monitoring method. The passive Optical Network is comprising at least an optical fiber link connecting two transceiver devices, one being an Optical Line Terminal (OLT) and one being a fiber termination, e.g. an end user (Subscriber) Optical Network Unit (ONU). An Optical Distribution Network is comprising at least one passive distribution node and optical fiber links of a distribution section behind said passive distribution node (splitter) and at least one optical fiber link of a feeder section up to said passive distribution node. In an Optical Distribution Network Optical Network Units are connected to the optical fiber link of a drop section of the distribution section and an Optical Line Terminal is connected to the optical fiber link of the feeder section.

BACKGROUND OF THE INVENTION

Optical fiber transmission systems are very widespread today and support very high speed data, audio and video transmission. Due to the increased importance and reliability levels that shall be supported, performance monitoring and management of networks become increasingly important. The need for reliable tools that are capable of detecting faults of the physical carrier, i.e. of the optical fibers, is increasingly felt. During implementation of fiber plants as well as afterwards during the network operation, it is necessary to apply a method to check the optical line condition, since a quick detection and identification of fiber link failures can help to minimise service downtime for the user and any loss of revenue to the network operator (provider).

As more fibers are deployed in metropolitan and access networks there is an increasing need for continuously or at least regularly supervising the performance of the optical links. Supervision enables preventive countermeasures in case of early detection of link degradations, thus securing a high availability of the network, e.g. for delivering critical services to business customers. Also in case of failures the introduction of supervising means helps to quickly localise and identify the cause of failure to initiate repair or restoration actions.

The network operator needs to quickly identify the cause of a link failure, i.e. to decide between the fiber plant, i.e. the optical fibers (fiber link) themselves, and the node equipment and, in case of fiber problems, to localise and identify the type of fault or degradation along the fiber link. Most fiber link problems are related to increased losses and reflections that either prevent from error free detection of the data or that disturb the emitting loser, causing distortions of the transmitted data. Problems due to changes of the chromatic dispersion are unlikely due to the low data rates considered in access. Therefore PON access network monitoring is a key for preventive maintenance and network reliability to be guaranteed by the operator of the PON.

Within access networks beside point to point (p-t-p) links passive optical distribution systems (PON) are of great interest. PON technology represents a cost effective architecture for a local loop mainly by eliminating complex and expensive active powered elements between a service provider and subscribers.

Continuous optical performance monitoring and supervision, detecting and localising faults, i.e. measuring characteristics of fiber links, in PONs in access are preferable network features increasing the service availability and providing substantial cost savings to the providers. PON networks are based on Optical Distribution Networks where splitters are located in the field outside the Central Office (CO), meaning a network centre, where an Optical Line Terminal is connected to the feeder section of the ODN.

In p-t-p networks Optical Time Domain Reflectometry (OTDR) techniques are used to monitor the network by launching an optical single pulse into a fiber link and measuring the reflected light enabling a characterisation of fiber optical links. It is difficult in a PON network to check the fiber link properties beyond a passive distribution node from the central office side because the responses, i.e. back scattered reflections, from all connected fiber link branches beyond the splitters are superimposed and a separation is not easily possible. The OTDR signal of each branch is partially masked by the signals of the others. Therefore, the use of existing conventional CO-based OTDR techniques for optical performance monitoring like the single pulse method is not applicable to achieve unambiguous results in PON-type optical distribution networks.

Furthermore, optical time domain reflectometry in passive optical networks can suffer from the significant splitting losses which are reducing the achievable measurement precision and are increasing the necessary measurement time. Especially PONs with distributed splitting location hinder reflectometric measurements of intermediate links, meaning fiber links between two splitters. This is of significant concern for measurement/monitoring techniques which use the optical link optical sources and detectors, meaning the sources and detectors of the transceiver devices of the ONUs and/or the ONTs, for monitoring purpose and cannot introduce high measurement signal power levels.

To mitigate this splitter attenuation problem, high peak output power optical sources are deployed in addition to the optical link emitters and coupled to the fiber links with dedicated extra optical switches or couplers. Basically high attenuation PON networks with distributed splitters are not monitored at this time, nor monitored continuously.

The basic problem to use OTDR technique in PON is the measuring at the distribution section, i.e. the fiber links after a splitter (distribution fibers), because of the attenuation of the forward signal, i.e. the exciting signal, as well as of the back scattered measuring signal. This attenuation causes the power level of the back scattered parts of a measuring signal emitted from OLT side to be not high enough for the desirable precise and sensitive measuring.

The known monitoring approaches cause considerable technical effort and high costs. The dedicated OTDR equipment is expensive and often has to be transported to the expected fault site on demand. The extra coupling devices introduce permanent additional insertion loss in the data link. No continuous monitoring is achievable.

OBJECT OF THE INVENTION

It is therefore an object of the invention to provide a method for monitoring a passive optical network and a passive optical network which overcome the problems associated with the related art, in particular which enable the monitoring of each individual fiber link branch of the distribution section of a passive optical distribution network.

SHORT DESCRIPTION OF THE INVENTION

The inventive method for monitoring at least one section, i.e. a measurement location, of an optical fiber link, preferably a distribution section behind a passive distribution node of a passive Optical Network is comprising the steps of:

sending a first optical monitoring signal through said section at a first signal sending time by sending means of a first transceiver device of the passive Optical Network, and sending at least a second optical monitoring signal through said section at a second signal sending time by sending means of a second transceiver device of the passive Optical Network.

The sending times of said optical monitoring signals, which are preferably Optical Time Domain Reflectometry Signals, are coordinated in such a way that the optical monitoring signals are superimposed while travelling through said section, building a measuring signal. The superposition may be carried out in a way that the envelopes of the signals are superimposed, i.e. the power level of the measuring signal results as the sum of the power levels of the individual signals. The transceiver devices are implemented as Optical Network Units or Optical Line Terminals. At least parts, i.e. for example reflected or scattered signal power, of said measuring signal are detected and characteristics thereof are analysed, preferably by at least one of the optical monitoring signal sending transceiver devices.

For example, the signal sending transceiver devices can send an inherent, meaning a permanently sent testing signal or a testing signal sent in defined time intervals as optical monitoring signals. Accordingly, no additional starting process for the sending of the optical monitoring signals is necessary. Only a phase adjustment of the signal sending transceiver devices, e.g. the ONUs is necessary in this case, what can be done by the aid of known Equalisation Delays which are known by the transceiver devices in known Passive Optical Networks. These Equalisation Delays are derived from the signal travelling time from the transceiver device to the OLT the transceiver device is communicating with, when the respective transceiver device is registered in the network.

The invention proposes to deploy optical time domain reflectometry from both ends of the PON and to arrange a concerted, i.e. concurrent puls emission, for example from the subscriber sides, i.e. from at least two ONUs, to increase the measurement signal power on the splitted fiber link segments, i.e. at a measuring location of this segments.

The concurrent usage of all the ONU (subcriber side) transmitters can reduce the round trip attenuation faced by a one side, single transmitter method to 50% in Decibels.

So segments situated between discrete splitting locations, thus masked by the optical attenuation of the respective splitters on both sides, can be characterised more precisely (attenuation, back scatter, reflections, bending, fault localization) or in shorter time frames with the sole support of at least two of, preferably all, the link emitters, i.e. the transceiver devices. A need to approach the ONU or subscriber site is avoided.

The inventive method can be implemented by using basically equipment and components being in place anyhow, i.e. this equipment can be adapted to carry out the inventive method, i.e. by means of new software.

If all said optical monitoring signals are sent by Optical Network Units as transceiver devices, an Optical Network Unit can be used to detect the parts of the measuring signal, i.e. for example the scattered signal power, without being blinded by a measuring signal sent by an Optical Line Terminal.

In a very preferred embodiment of the invention, the step of sending a measurement co-ordination message to at least one of said transceiver devices comprising information that an optical monitoring signal is to be sent and the signal sending time, preferably a starting bit number within a defined frame or relative to a time information distributed in the network, of this optical monitoring signal by a central station of the passive Optical Network, preferably an Optical Line Terminal, is being performed. Therefore, a measuring time can be chosen flexibly. The measuring time can be chosen in a way that regular data travel on the passive Optical Network is not disturbed or is only disturbed in a minimum. In known passive Optical Networks a system time is used by counting bits from a frame time starting point. If the signal sending time is set as a starting bit number of this system time no additional system time adjustments of the signal sending devices have to be carried out. If the measurement co-ordination message is sent to only one of said transceiver devices, the central station has to send the second monitoring signal itself. Preferably, the measurement co-ordination message is sent to at least two Optical Network Units as transceiver devices.

Especially in the latter preferred embodiment of the inventive method preferably pulsed signals are sent as optical monitoring signals and the signal sending times are chosen by time scheduling means of said central station. A time gap between said signal sending times is calculated by correcting at least one of said chosen signal sending times with a known Equalisation Delay by said optical monitoring signal sending transceiver devices. This time gap is corresponding to a difference of signal travelling times of the signal travelling paths of the optical monitoring signals to said section to be monitored, which is the same as a time difference of signal travelling times of the whole signal travelling paths from Optical Network Units to an Optical Line Terminal. Even though the time gap could also be calculated from the signal travelling paths to the measurement location, it is preferred to use Equalisation Delays, which are known by the transceiver devices in known Passive Optical Networks. These Equalisation Delays are derived from the signal travelling time from the transceiver device to the OLT the transceiver device is communicating with, when the respective transceiver device is registered in the network.

Therefore, the inventive method leverages the temporal ranging anyhow done in PONs for the collision free upstream multiplexing.

Hereby, the ranging process done in PONs anyhow supports the constructive superposition of the measurement energy pulses (monitoring signals). The pulses emitted by all the transmitters (transceiver devices) are delayed by the complement of the travel time to the measurement location in order to combine all signals and all excitation energy at the same location (measurement location) at the some instance in time. The temporal correction value is the same as used for the time division multiplexing on the PON. In essence, for the reflectometry according to the invention a situation is forced, that is to be avoided during normal operation by regular delay ranging and overlap free scheduling. The ranging process itself normalizes the propagation delay differences of the connected ONUs which means the emissions would collide if the scheduler would grant the same slot to all the ONUs. Exactly this is done according to the invention to arrange for the intended power increase at a certain measurement location.

A central station for a passive Optical Network according to the invention is comprising:

time scheduling means, being designed to choose signal sending times of optical monitoring signals co-ordinated in such a way that the optical monitoring signals are superimposed while travelling through at least one section to be monitored of an optical fiber link, preferably a distribution section behind a passive distribution node, of the passive Optical Network, to build a measuring signal and sending means, being designed to send a measurement co-ordination message to at least one Optical Network Unit comprising information that a monitoring signal is to be sent and the signal sending time, preferably a starting bit number, of this monitoring signal.

The inventive central station can act together with Optical Network Units to perform the steps of the inventive method, especially the steps of the method according to the mentioned very preferred embodiment of the invention. Therefore, the inventive central station provides the advantages of the inventive method.

If the central station is comprising an Optical Line Terminal comprising sending means, being designed to send a monitoring signal through an optical fiber link at one of the signal sending times, the Optical Line Terminal can be used as one of the optical monitoring signal sending transceiver devices.

Preferably, said time scheduling means are being designed to choose said signal sending times within a time interval allocated to the scheduling means by a time division multiplexing system of the Passive Optical Network. Therefore, an existing time division multiplexing system of the Passive Optical Network can be used to choose the signal sending times in a way that regular data traffic on the Passive Optical Network is not disturbed.

An Optical Network Unit according to the invention for a passive Optical Network is comprising:

receiving means, being designed to receive a measurement co-ordination message comprising information that a monitoring signal is to be sent and the signal sending time, preferably a starting bit number, of this monitoring signal and sending means, being designed to send a monitoring signal through an optical fiber link at said signal sending time.

The inventive Optical Network Unit can act together with at least one inventive central station to perform the steps of the inventive method, especially the steps of the method according to the mentioned very preferred embodiment of the invention. Therefore, the inventive central station provides the advantages of the inventive method.

Advantageously, the inventive Optical Network Unit is comprising time correction means, being designed to correct said signal sending time with a known Equalisation Delay. Therefore, the sending times of the optical monitoring signals can be coordinated by the inventive Optical Network Unit using the known delay ranging in a passive Optical Network.

A passive Optical Network, preferably an Optical Distribution Network, according to the invention is comprising at least one inventive central station and at least one inventive Optical Network Unit.

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

BRIEF DESCRIPTION OF THE DRAWING

The embodiments of the invention will now be described with reference to the accompanying drawing.

In FIG. 1 a passive optical distribution network according to the invention carrying out the inventive method is shown schematically.

DETAILED DESCRIPTION OF THE INVENTION

The Optical Distribution Network is shown schematically. The Optical Distribution Network is comprising four passive distribution nodes 10-13, e.g. optical splitters, and optical fiber links 15 of a distribution section 20 behind the first passive distribution node 10, meaning the range between the first distribution node 10 and fiber terminating Optical Network Units 1-9 (subscriber stations), and an optical fiber link 16 of a feeder section 22 up to said first passive distribution node 10. The passive Optical Distribution Network is comprising nine Optical Network Units 1-9 and an Optical Line Terminal 30 as transceiver devices. Eight of the ONUs are only shown as single boxes for illustration purposes. The Optical Line Terminal 30 is part of a central station 31 according to the invention. The central station 31 of the Passive Optical Network is comprising time scheduling means 32 and sending means 34, which are identical with sending means of the OLT 30. The time scheduling means 32 are being designed to choose signal sending times of optical monitoring signals 40-45 co-ordinated in such a way that the optical monitoring signals 40-45 are superimposed while travelling through a section of an optical fiber link 15,16 to be monitored. This measurement location 50 is situated between the first splitter 10 and the second splitter 11 in the example of the FIGURE. By superimposing the optical monitoring signals 40-45 a measuring signal 52 is built, what is illustrated by means of a diagram in the left lower corner in the FIGURE, showing the local power level LP of the superimposed signals depending on time t.

The sending means 34 are being designed to send a measurement co-ordination message to Optical Network Units. This measurement co-ordination message is comprising information that a monitoring signal is to be sent and the signal sending time, e.g. a starting bit number, of this monitoring signal. A measurement co-ordination message is sent to the ONUs 1-9, what is illustrated by means of small circles 60 on the optical fiber links 15,16 connecting the OLT 30 and these ONUs 1-9. In case of the shown example only six ONUs 1-6 are sending optical monitoring signals 40-45, because the measurement location 50 is situated between the first splitter 10 and the second splitter 11 in the example of the FIGURE, so optical monitoring signals which would be sent by the ONUs 7,8,9 would not reach this measurement location 50.

The information transmitted by the measurement co-ordination message 60 is depending on how the properties of the monitoring signals are specified in the inventive Passive Optical Network. If predefined monitoring signals are to be sent, i.e. properties of the monitoring signals like frequency, duration, modulation and/or intensity are predefined, the information contained in the measurement co-ordination message only characterizes a sending time of the signal. It is also possible to have stored a catalogue of different kinds of monitoring signals in the signal sending transceiver devices, e.g. the inventive ONUs. In this case the measurement co-ordination message 60 is comprising a code, e.g. a short number, according to which monitoring signal which is to be sent is chosen by the transceiver device. Furthermore, the measurement co-ordination message 60 can be comprising a code characterizing the transceiver devices, which should send a monitoring signal.

If no predefined monitoring signal is to be sent, the measurement co-ordination message is comprising a data set comprising all parameters of the monitoring signals to be sent, e.g. frequency, duration, modulation and/or intensity, and the sending time of the signal.

The central station 31 is arranged in such a way that it is in the position to instruct the subscriber stations, i.e. the ONUs 1-9, to start sending a monitoring signal 40-45 in such a way that at the common part of the signal paths from subscriber stations to the central station 31 all monitoring signals 40-45 are superimposed to one another.

The scheduling means 32 can be designed to choose said signal sending times within a time interval allocated to the scheduling means 32 by a time division multiplexing system 70 of the Passive Optical Network. This time division multiplexing system 70, for example, can be localised in the central station 31 or in any network supervising device. The time division multiplexing system 70 and the scheduling means 32 may be implemented as at least one software programmable microprocessor. Furthermore, the OLT 30 is comprising receiving means 36. These receiving means 36 may be used for receiving any data traffic on the Optical Network and/or for detecting and analysing characteristics of at least parts of the measuring signal.

The inventive Optical Network Units 1-9 are comprising receiving means 80, sending means 81 and time correction means 82, being interconnected to enable them working together, what is only shown for one ONU 3 in the FIGURE. The receiving means 80 of the ONUs 1-9 are being designed to receive the measurement co-ordination message as mentioned. Furthermore, the receiving means 80 can be designed to receive parts of the measuring signal 52 reflected within said section, i.e. the measuring location 50, of the optical fiber link 15,16. Accordingly, the ONUs 1-9 are comprising detecting and/or analysing means, being designed to detect and/or analyse characteristics of the received parts of the measurement signal 52. These detecting and/or analysing means can be located in any transceiver device of the passive Optical Network or even any other device connected to the passive Optical Network. The time correcting means 82 and the detecting and/or analysing means 32 may be implemented as at least one software programmable microprocessor.

The sending means 81 of the ONUs 1-9 are being designed to send a monitoring signal 40-45 through an optical fiber link 15,16 at the signal sending time submitted by the received measurement co-ordination message 60. In the FIGURE this is illustrated by means of the diagram in the upper right corner of the FIGURE, showing an emission power level EP of a monitoring signal of an individual ONU depending on time t. The submitted signal sending time is called $t_p$ in the diagram.

Accordingly, the ONUs 1-9 as subscriber stations are being arranged in such a way that they are in the position to start sending a monitoring signal 40-45 at a given time $t_p$ when instructed so. The time correction means 82 of the ONUs 1-9 are being designed to correct the signal sending time, received within the measurement co-ordination message 60 with an individual Equalisation Delay, known by each ONU 1-9. In the diagram the Equalisation Delay is called $Td_i$, wherein i enumerates the individual ONU 1-9. The signal sending time is corrected by subtracting the Equalisation Delay $Td_i$ of the individual ONU 1-9 from the submitted signal sending time $t_p$.

As shown, the central station 31 instructs six subscriber stations 1-6, in general at least two or at least one, if the central station 31 itself sends a monitoring signal, to start sending a monitoring signal 40-45 towards the central station 31 in such a way that at the common part of the signal paths from said subscriber stations all monitoring signals 40-45 are superimposed to one another. At at least one point of the passive optical network, i.e. a measurement location 50, the superimposed monitoring signals and their power level, or reflected or scattered signal power thereof are detected for analysis.

This invention relates to a method for monitoring at least one section (50) of an optical fiber link (15,16), preferably a distribution section behind a passive distribution node (10-13), of a passive Optical Network, and a passive Optical Network being designed to perform the steps of the method. The method is comprising the steps of:

sending a first optical monitoring signal (40) through said section at a first signal sending time by sending means (81,34) of a first transceiver device (30,1-9) of the passive Optical Network, sending at least a second optical monitoring signal (41-45) through said section at a second signal sending time by sending means (81,34) of a second transceiver device (30,1-9) of the passive Optical Network, wherein the sending times of said optical monitoring signals (40-45), preferably Optical Time Domain Reflectometry Signals, are co-ordinated in such a way that the optical monitoring signals (40-45) are superimposed while travelling through said section, building a measuring signal (52), and detecting and analysing characteristics of at least parts of said measuring signal (52) preferably by at least one of the optical monitoring signal sending transceiver devices (1-9).

The invention claimed is:

1. A method for monitoring at least one section of an optical fiber link of a passive Optical Network, comprising the steps of sending a first optical monitoring signal through said section at a first signal sending time by sending means of a first transceiver device of the passive Optical Network, sending at least a second optical monitoring signal through said section at a second signal sending time by sending means of a second transceiver device of the passive Optical Network, wherein the sending times of said optical monitoring signals are co-ordinated in such a way that the optical monitoring signals are superimposed while travelling through said section, building a measuring signal, and detecting and analysing characteristics of at least parts of said measuring signal by at least one of the optical monitoring signal sending transceiver devices.

2. The method according to claim 1, wherein all said optical monitoring signals are sent by Optical Network Units as transceiver devices.

3. The method according to claim 1, further comprising sending a measurement co-ordination message to at least one of said transceiver devices comprising information that a designated optical monitoring signal is to be sent and a designated signal sending time of the designated optical monitoring signal by a central station of the passive Optical Network is performed.

4. The method according to claim 3, wherein pulsed signals are sent as optical monitoring signals and the signal sending times are chosen by time scheduling means of said central station, and a time gap between said signal sending times is calculated by correcting at least one of said chosen signal sending times with a known Equalisation Delay by at least one of said optical monitoring signal sending transceiver devices.

5. The method according to claim 3, wherein the designated signal sending time is a starting bit number.

6. The method according to claim 3, wherein the central station of the passive Optical Network is an Optical Line Terminal.

7. The method according to claim 1, wherein the optical monitoring signals are Optical Time Domain Reflectometry Signals.

8. A central station for a passive Optical Network comprising time scheduling means, being designed to choose signal sending times of optical monitoring signals co-ordinated in such a way that the optical monitoring signals are superimposed while travelling through at least one section to be monitored of an optical fiber link of the passive Optical Network, to build a measuring signal and sending means, being designed to send a measurement co-ordination message to at least one Optical Network Unit comprising information that a designated monitoring signal is to be sent and a designated signal sending time of the designated monitoring signal.

9. The central station according to claim 8, wherein the central station is comprising an Optical Line Terminal comprising sending means, being designed to send the designated monitoring signal through an optical fiber link at the designated signal sending time.

10. The central station according to claim 8, wherein said time scheduling means are being designed to choose said signal sending times within a time interval allocated to the scheduling means by a time division multiplexing system of the Passive Optical Network.

11. The central station according to claim 8, wherein the at least one section to be monitored of an optical fiber link is a distribution section behind a passive distribution node.

12. The central station according to claim 8, wherein the designated signal sending time is a starting bit number.

13. The central station according to claim 8, wherein the measurement co-ordination message is sent to a plurality of Optical Network Units.

14. The measurement co-ordination message according to claim 13, wherein monitoring signals sent from the plurality of Optical Network Units are delayed by a travel time to arrive at a distinct point at a same time.

15. The measurement co-ordination message according to claim 14, wherein the travel time is a time required for the monitoring signals to travel from the plurality of Optical Network Units to a measurement location.

16. The central station according to claim 8, wherein the monitoring signal comprises a superposition of measurement energy pulses which includes all excitation energy at a same location and instance in time.

17. An Optical Network Unit for a passive Optical Network comprising receiving means, being designed to receive a measurement co-ordination message comprising information that a monitoring signal is to be sent and a signal sending time of the monitoring signal and sending means, being designed to send the monitoring signal through an optical fiber link at said signal sending time, wherein the Optical Network Unit comprises time correction means, being designed to correct said signal sending time with a known Equalisation Delay.

18. The Optical Network Unit according to claim 17, wherein the monitoring signal comprises a superposition of measurement energy pulses which includes all excitation energy at a same location and instance in time.

19. The Optical Network Unit according to claim 17, wherein the signal sending time is a starting bit number.

20. A passive Optical Network comprising a central station and at least one Optical Network Unit said central station comprising time scheduling means, being designed to choose signal sending times of optical monitoring signals co-ordinated in such a way that the optical monitoring signals are superimposed while travelling through at least one section to be monitored of an optical fiber link of the passive Optical Network, to build a measuring signal and sending means, being designed to send a measurement co-ordination message to at least one Optical Network Unit comprising information that a designated monitoring signal is to be sent and a designated signal sending time of the designated monitoring signal; and said Optical Network Unit comprising receiving means, being designed to receive the measurement co-ordination message comprising information that the designated monitoring signal is to be sent and the designated signal sending time of this monitoring signal and sending means, being designed to send the designated monitoring signal through an optical fiber link at the designated signal sending time.

21. The central station according to claim 20, wherein the at least one section to be monitored of an optical fiber link is a distribution section behind a passive distribution node.

22. The passive Optical Network according to claim 20, wherein the designated signal sending time is a starting bit number.

* * * * *

UNITED STATES PATENT AND TRADEMARK OFFICE
CERTIFICATE OF CORRECTION

PATENT NO. : 7,620,319 B2  Page 1 of 1
APPLICATION NO. : 11/285292
DATED : November 17, 2009
INVENTOR(S) : Heinz-Georg Krimmel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this

Twenty-sixth Day of October, 2010

David J. Kappos
*Director of the United States Patent and Trademark Office*